Oct. 21, 1930.   O. WULFERT   1,778,992
MOTOR MOUNTING
Filed Jan. 26, 1929

Inventor
OTTO WULFERT
By *O. O. Huffman*
Att'y.

Patented Oct. 21, 1930

1,778,992

UNITED STATES PATENT OFFICE

OTTO WULFERT, OF ST. LOUIS, MISSOURI, ASSIGNOR TO WAGNER ELECTRIC CORPORATION, OF ST. LOUIS, MISSOURI, A CORPORATION OF DELAWARE

MOTOR MOUNTING

Application filed January 26, 1929. Serial No. 335,265.

The object of my invention is to provide an improved mounting for motors and other machines, whereby the vibrations produced by the operation of the machine will not be transmitted to the main support and through it to a cabinet or other article to which this support may be attached, and thus avoid the objectionable production and magnification of noise.

Specifically, my object is to provide resilient mounting members so held as to be unitary with the rigid supporting members of the machine and not dependent upon any part of the supported machine to hold them in position. A further object is to produce a mounting in which a predetermined degree of compression of a resilient supporting member is readily secured by means which also function to maintain the resilient member in position and to constitute the supporting element which is directly secured to the motor frame.

Figure 1:
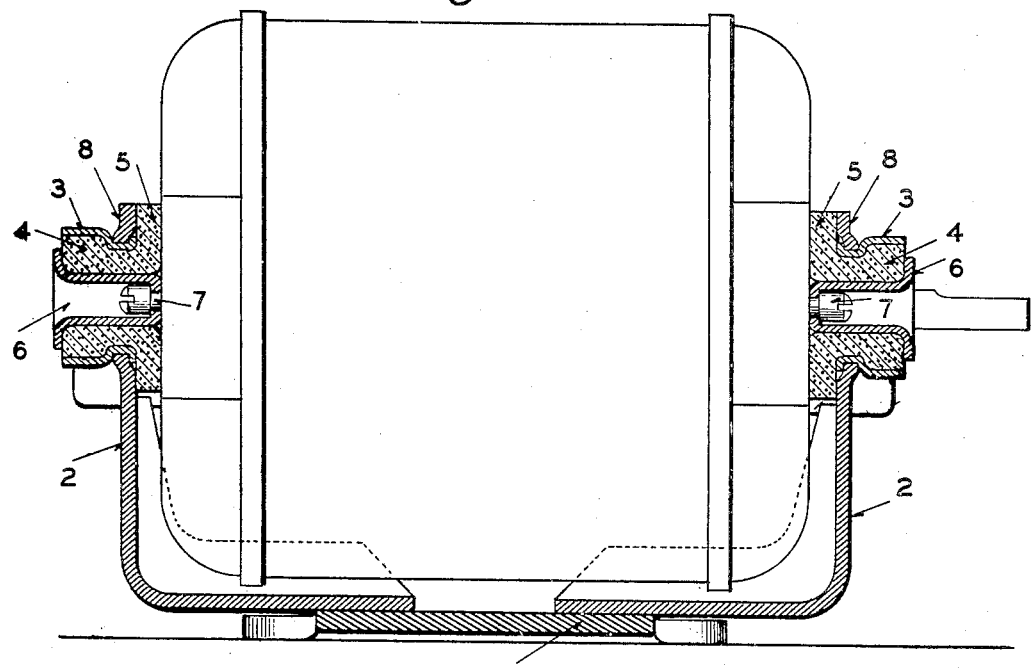
Figure 3:
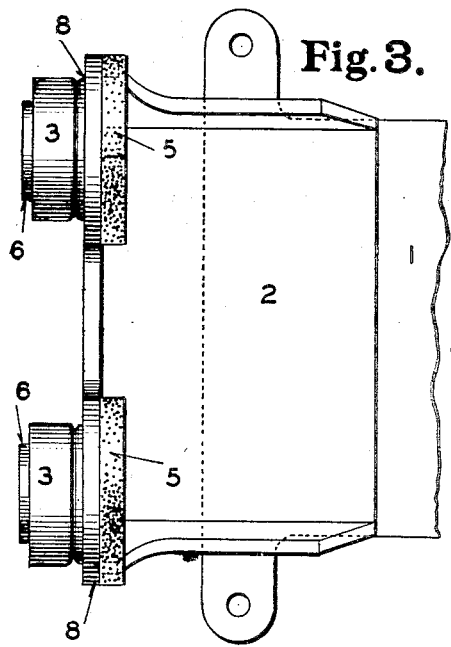
Figure 2:
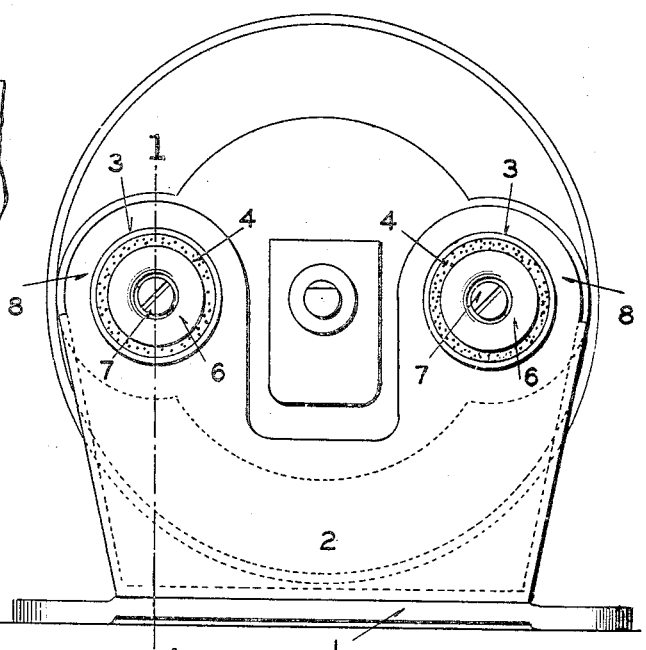
Figure 4:
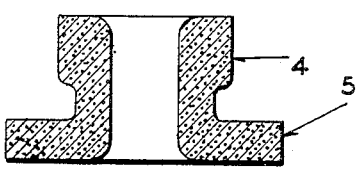

In the accompanying drawings Figure 1 is a side elevational view of a motor showing its support and my improved mounting in cross-section along the line 1—1' of Figure 2; Figure 2 is an end elevation of the motor and support; Figure 3 is a top view of one end of the complete motor supporting means shown in Figure 1; and Figure 4 is a cross-sectional view of one of the resilient mounting elements or bushings illustrated in the other figures.

The main motor supporting apparatus illustrated comprises a base member 1 to which is secured, preferably by spot welding, the vertically extending supporting plates 2, each provided with two extensions 8, the lower portions of which are of channel section, as indicated, to give rigidity. These parts form what is commonly referred to as the motor supporting cradle.

In accordance with my invention each of the two extensions 8 of each of the end members 2 of the cradle are provided with openings in which tubular members 3 are secured, the outer ends of these members being of larger diameter than the openings and provided with contracted portions, as shown, which fit the openings. These tubular members are permanently held in position in the openings by flanging over their inner ends, as shown. Bushings 4 of resilient material, such as rubber, are of such external diameter that they may be pressed into the tubular members 3 and are each provided with a laterally extending flange 5 forming a cushion between the ends of the motor frame and the inner faces of the extensions 8. Tubular nipples 6 are inserted through the resilient bushings and are of such diameter with respect to the normal diameter of the central opening in the bushing that their insertion compresses the material of the bushing between their outer surfaces and the inner surfaces of the tubular members 3, and, while I have shown a bushing having a peripheral groove adjacent its flange, which fits over the contracted portion of the tubular member 3, the bushing would be held in place by the nipple even if such groove were not provided, as the greater compression of the rubber at the contracted portion of the tubular member 3 would cause such "flow" of the rubber as would produce a retaining shoulder on it engaging with the outer shoulder of the contracted portion. Screws or bolts 7, whose shanks extend through the bottoms of the nipples enter threaded bosses on the end plate of the motor and thus support the motor from the nipples. Since these nipples can transfer impulses to parts of the main supporting cradle only through the resilient bushings, the desired resilient mounting of the motor is secured.

That the mountings may be assembled in the supporting cradle and will remain in position without the cooperation of any part of the motor constitutes a manifest advantage in manufacture, assembly and use.

Having fully described my invention, what I claim as new and desire to secure by Letters Patent of the United States is:

1. A machine mounting which comprises a main supporting member, a rigid tubular member carried by said support, a tubular bushing of resilient material fitted within said tubular member, a second rigid tubular member extending through the bushing and of such diameter as to compress the material of the bushing between it and the outer tubular member, said bushing having an end flange positioned to lie between the machine and the support, and means insertible through the inner tubular member for securing it to the machine.

2. A motor mounting which comprises a main supporting member, a tubular member extending through and secured at its inner end to said support, a tubular bushing of resilient material within said tubular member, an inner tubular member extending through the bushing and provided with an inner shoulder, and means insertible through said last named member and engaging with said shoulder to secure the member to the motor casing.

3. A motor mounting which comprises a main supporting member, a tubular member extending through and secured at its inner end to said main support and provided with an inner shoulder, a tubular bushing of resilient material within said tubular member and engaging said shoulder, an inner tubular member extending through the bushing, said member being provided at one end with a flange to engage the end of the bushing and with an inner shoulder at the other end, and means engaging with said shoulder to secure the inner member to the motor casing.

4. A motor mounting which comprises a main supporting member, a rigid tubular member having a reduced portion extending through and permanently secured to the main support, a tubular bushing of resilient material positioned within said tubular member and provided with a portion overlying the inner end of said member, a second tubular member extending through the bushing, and means insertible through said member to secure it to the motor casing.

In testimony whereof, I hereunto affix my signature, this 22d day of January, 1929.

OTTO WULFERT.